United States Patent [19]

Savina

[11] Patent Number: 4,764,543
[45] Date of Patent: Aug. 16, 1988

[54] MICROCELLULAR FOAMED OR REACTION INJECTION MOLDED POLYURETHANE/POLYUREAS EMPLOYING AMINE TERMINATED POLYMERS AND DIAMINE CHAIN EXTENDERS

[75] Inventor: Michael R. Savina, Auburn, Mich.

[73] Assignee: The Dow Chemical Company, Midland, Mich.

[21] Appl. No.: 81,078

[22] Filed: Aug. 3, 1987

[51] Int. Cl.$^4$ ............................................. C08G 18/14
[52] U.S. Cl. ................................. 521/160; 521/167; 528/67; 528/76; 528/77
[58] Field of Search ............................ 528/67, 76, 77; 521/160, 167

[56] References Cited

U.S. PATENT DOCUMENTS 4,642,320 2/1987 Turner et al. ......................... 528/76

Primary Examiner—Maurice J. Welsh

[57] ABSTRACT

Microcellular foamed or reaction injection molded polyurethane/polyurea elastomers are prepared by reacting an aliphatically bound polyisocyanate, a primary or secondary amine terminated polymer, and an aliphatic diamine chain extender represented by the formulas:

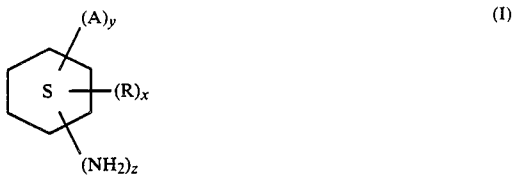

wherein
A is represented by the group

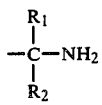

each R, $R_1$ and $R_2$ are independently hydrogen or an alkyl group having from 1 to about 4 carbon atoms, x has a value from zero to about 4; y has a value of 1 or 2; z has a value of zero or 1; and when y is 2, z is zero and the sum of y and z is 2 and

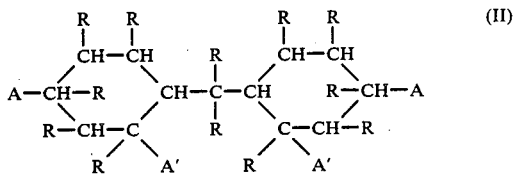

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H.

16 Claims, No Drawings

MICROCELLULAR FOAMED OR REACTION INJECTION MOLDED POLYURETHANE/POLYUREAS EMPLOYING AMINE TERMINATED POLYMERS AND DIAMINE CHAIN EXTENDERS

BACKGROUND OF THE INVENTION

1. Field of the Invention

This invention relates to microcellular foamed or reaction injection molded polyurethane/polyureas prepared from aliphatic or araliphatic diisocyanates wherein the isocyanate group is aliphatically bound.

2. Description of the Prior Art

Reaction injection molded polyurethanes are well-known in the art as described by F. Melvin Sweeney in *Introduction to Reaction Injection Molding*, Technomics, Inc., 1979. The use of reaction injection molding (RIM) of polyurethanes in the production of structural parts for automotive applications such as fenders, doors and body panels as well as in other applications such as computer housings, office equipment housings, sports equipment and the like is well-known.

In the practice of RIM processes to produce a molding having a compact surface skin, a mold is filled with a highly reactive, liquid starting component within a very short time by means of a high output, high pressure dosing apparatus after the components have been mixed in so-called positively controlled mixing heads. In such "one-shot" processes, the highly reactive starting materials are generally a polyether or a polyester having a plurality of active hydrogen moieties, a polyisocyanate and a chain extender such as a diol or a polyamine as well as other conventional additives such as blowing agents, catalysts, fillers and the like. These are mixed and delivered to a mold within a very short time (generally about 2 to 4 seconds). The mixture is cured to yield a finished product within a short time (generally about 1 to 2 minutes) and thereby produce a polyurethane product. The polyurethane-forming compositions have been the material of choice for RIM applications because their short reaction times allow rapid cure and short cycle times.

Almost all of the commercial production for RIM applications have to date been based upon diphenyl methane diisocyanate (MDI) derivatives. MDI based urethanes have excellent processibility and can be formulated to give a wide range of physical properties. However a major drawback of the MDI based urethanes is poor weatherability. In the presence of ultraviolet light from the sun these urethanes tend to discolor, lose surface gloss, and weaken due to the formation of quinoid structures. The extensive use of stabilizers to protect the MDI-based urethanes against photo degradation have allowed limited use in outdoor applications. For satisfactory performance in actual practice, a light stable topcoat must be applied either by painting after molding or by an in-mold coating process. Both coating processes require additional capital investment and add to the processing cost.

While aliphatic diisocyanates, those with the NCO groups attached to aliphatic rather than aromatic carbon atoms, have been commercially available for many years, and are far less sensitive to photo degradation and weathering than those made with aromatic diisocyanates, these are higher in cost and generally slower in reactivity than the aromatic diisocyanates and therefore have not been used generally in RIM applications. Recently, aliphatic diisocyanates which are lower in cost than previously commercially available aliphatic diisocyanates have become commercially available. These new aliphatic isocyanates, while they contain aromatic moieties, have characteristics typical of aliphatic diisocyanates because the NCO groups are aliphatically bound, i.e., shielded from the aromatic ring by protective methyl groups. These new diisocyanates are disclosed by Arendt et al in *Journal of Cellular Plastics*, November/December, 1982, pages 376–383, incorporated herein by reference. Other araliphatic diisocyanates are disclosed in U.S. Pat. No. 4,051,166 to Richter et al, incorporated herein by reference. A class of aliphatic diisocyanate is disclosed in U.S. Pat. No. 4,565,835 to Oertel et al, incorporated herein by reference.

Amine-terminated polyethers are disclosed for use in RIM processes by Dominguez in *Amine-Terminated Polyether Resins in RIM*, Proc. SPI Annu. Tech./Mark. Conf., 28th(Polyurethane Mark. Technol.: Partners Prog.), 312–15 (1984). Amine-terminated polyether resins are disclosed by Dominguez as highly reactive polyether intermediates for use in the RIM process. The use of such amine-terminated polyether resins in RIM processes in combination with aromatic diisocyanates is disclosed in U.S. Pat. No. 4,474,900; U.S. Pat. No. 4,474,901; and U.S. Pat. No. 4,513,133 to Dominguez.

Aliphatic diamines are disclosed in U.S. Pat. No. 4,048,102, to Quock et al, as useful crosslinkers in the preparation of flexible polyurethane foams which can replace 4,4'-methylene bis(2-chloroaniline). Such flexible polyurethane foams are produced primarily utilizing aromatic polyisocyanates, although useful organic polyisocyanates can include aliphatic diisocyanates. Reactive diamines are also disclosed as useful as a reactant in the preparation of a polyurethane molded foam or elastomer product in U.S. Pat. No. 4,384,052, to McBrayer et al and in U.S. Pat. No. 4,210,728, to Patton, Jr. et al. Each of the latter patents describe the preparation of polyurethanes from organic polyisocyanates which can be aliphatic, cycloaliphatic, aromatic or mixtures thereof.

There is no teaching in any of the above references that reaction systems comprising the diamines defined herein, aliphatic or aliphatically bound araliphatic diisocyanates, and amine-terminated polyethers are particularly suitable for RIM processes. Thus the combination of slow reactivity and poor physical properties obtained in the prior art utilizing aliphatic or araliphatic diisocyanates in the RIM process can be overcome by the addition of amine-terminated polyethers with the diamine chain extenders of the invention.

SUMMARY OF THE INVENTION

A polyurethane/urea elastomer, process for preparation thereof, a microcellular foamed polyurethane/urea elastomer, and a reactive composition are disclosed. The RIM molded elastomer of the invention comprises the reaction product of an aliphatically bound diisocyanate, an amine terminated active hydrogen containing polymer, i.e., a polyether and, as a chain extender, an aliphatic diamine as described herein. Suitable reaction speed can be obtained in the process of the invention without the use of any catalyst for the reaction. In fact, RIM molded inventive products can be removed from the mold in very short times, for instance, about 10 seconds after filling the mold. Thus the use of said diamine in the process of the invention provides improved green strength in RIM molded products. Therefore, the usually slower reacting aliphatic diisocyanates can be substituted for the faster reacting aromatic diisocyanates and still obtain a product having a fast developing green strength. Unexpectedly, the molded product requires little or no application of mold release agent to the mold between moldings. In the inventive process for the production of a RIM polyurethane/urea elastomer, a reactive composition comprising an aliphatically bound polyisocyanate, an amine terminated polyether and an aliphatic diamine, as defined herein, are subjected to conventional RIM molding conditions.

The various aspects of the present invention are useful in the preparation of microcellular foams or various non-foamed structural automotive parts such as fenders, doors, quarter panels, and the like or in the manufacture of computer housings, office equipment housings, sports equipment, and many other applications where products of a RIM process have before been employed.

DETAILED DESCRIPTION OF THE INVENTION AND THE PREFERRED EMBODIMENTS

The chain extender aliphatic diamines which are suitably employed in the practice of the invention are represented by formulas I and II, as follows:

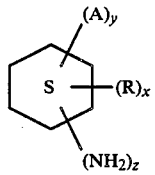

wherein
A is represented by the group

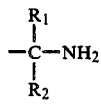

each $R$, $R_1$, and $R_2$ are independently hydrogen or an alkyl group having 1 to about 4 carbon atoms; x has a value of zero to about 4; y has a value of 1 or 2; z has a value of zero or 1 and when y is 2, z is zero and the sum of y and z is 2 or

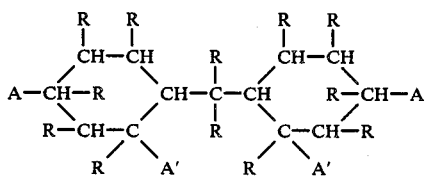

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H.

Representative diamines under Formula I are isophorone diamine and 1,8-p-diaminomenthane. Representative diamines under formula II include:
bis(4-aminocyclohexyl)methane
bis(4-amino-3-methylcyclohexyl)methane
bis(4-amino-3,5-dimethylcyclohexyl)methane
bis(4-amino-2,3,5-trimethylcyclohexyl)methane
1,1-bis(4-aminocyclohexyl)propane
2,2-bis(4-aminocyclohexyl)propane
1,1-bis(4-aminocyclohexyl)ethane
1,1-bis(4-aminocyclohexyl)butane
2,2-bis(4-aminocyclohexyl)butane
1,1-bis(4-amino-3-methylcyclohexyl)ethane
2,2-bis(4-amino-3-methylcyclohexyl)propane
1,1-bis(4-amino-3,5-dimethylcyclohexyl)ethane
2,2-bis(4-amino-3,5-dimethylcyclohexyl)propane
2,2-bis(4-amino-3,5-dimethylcyclohexyl)butane
2,4-diaminodicyclohexylmethane
4-aminocyclohexyl-4-amino-3-methylcyclohexylmethane
4-amino-3,5-dimethylcyclohexyl-4-amino-3-methylcyclo-hexylmethane and
2-(4-aminocyclohexyl)-2-(4-amino-3-methylcyclohexyl)ethane.

Most of the above products exist in stereoisomeric form and any isomer ratio can be employed in the present invention.

The amount of diamine to be used in the preparation of the reaction injection molded polyurethane/urea elastomers of the invention is generally about 5 to about 50% by weight based upon the weight of the amine terminated polyether. Preferably about 15 to about 30% and most preferably about 20 to about 25% of the diamine is used, all based upon 100 parts by weight of the amine terminated polyether.

The high molecular weight amine terminated polymers useful in this invention include, for example, primary and secondary amine terminated polyether or polyester polyols of greater than about 1,500 to about 2,500 average molecular weight having from 2 to 6 functionality, preferably from 2 to 3, and an amine equivalent weight from about 1,000 to about 4,000. Mixtures of amine terminated polyethers, polyesters and polyether/polyester blends may be used. It is preferred that the high molecular weight amine terminated polyether have a molecular weight of about 2,000 to about 5,000.

The high molecular weight amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used. Representative amine terminated polyethers are a propylene oxide triamine having a molecular weight of about 5,000 and a propylene oxide diamine having a molecular weight of about 2,000.

The high molecular weight amine terminated polyester resins useful in this invention are made by aminating an hydroxyl terminated polyester, preferably containing all secondary hydroxyl groups for ease of amination. Normally greater than 50 percent of the hydroxyl groups are replaced by amine hydrogens. Suitable polyester polyols which may be used in the invention are those, for example, prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Aliphatically bound polyisocyanates have long been known in the prior art. Such compositions as methylene bis(4-cyclohexyl isocyanate), the mixture of all three isomers is suitable; isophorone diisocyanate; dimethylthiobicyclononane diisocyanate; hexamethylene diisocyanate; and the biurret of hexamethylene diisocyanate are suitable aliphatically bound polyisocyanates for use in the preparation of the reaction injection molded polyurethane/urea elastomers of the invention. Methylene bis(4-cyclohexyl isocyanate) is the most preferred species of aliphatically bound polyisocyanate for use in the process of the invention. Recently new aliphatically bound isocyanates have become commercially available. One class of these aliphatically bound isocyanates which is useful in practicing the invention is the tetramethyl xylene diisocyanates having either meta or para structures. These polyisocyanates have characteristics typical of aliphatic diisocyanates, even though they contain aromatic rings, because the isocyanate groups are shielded from the ring by protective methyl groups.

Other aliphatically bound polyisocyanates useful in the practice of the invention include the aliphatic diisocyanates disclosed in U.S. Pat. No. 4,565,835 to Oertel et al, incorporated herein by reference. Representative useful isocyanatoalkyl substituted cyclohexanes are as follows:

1-(isocyanatomethyl)-1-(3-isocyanatopropyl)cyclohexane 1-(isocyanatomethyl)-1-(2-isocyanatoethyl)cyclohexane 1-alkyl-2-isocyanatomethyl-4-isocyanatoalkylcyclohexanes 1-(2-isocyanatoethyl)-4-(isocyanatomethyl)-4-(3-isocyanatopropyl)cyclohexane 1,4-bis(2-isocyanatoethyl)cyclohexane The araliphatic (aliphatically bound) diisocyanates disclosed in U.S. Pat. No. 4,051,166 to Richter et al, incorporated herein by reference, are also useful in the practice of the invention. These comprise an araliphatic diisocyanate having the formula:

OCN(CH$_2$)$_3$OArX(CH$_2$)$_3$NCO wherein X is oxygen or a single bond and Ar is an arylene radical.

The term "arylene" means a radical obtained by removing two nuclear hydrogen atoms from an aromatic hydrocarbon, and is inclusive of phenylene, tolylene, naphthylene, diphenylylene, and radicals having the formula:

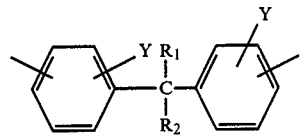

wherein R$_1$ and R$_2$ each represent a moiety selected from the class consisting of hydrogen and alkyl having from 1 to 4 carbon atoms and Y is selected from the group consisting of hydrogen, alkyl from 1 to 4 carbon atoms, and alkoxy from 1 to 4 carbon atoms. Illustrative of alkyl from 1 to 4 carbon atoms are methyl, ethyl, propyl, butyl and isomeric forms thereof. Illustrative of alkoxy from 1 to 4 carbon atoms are methoxy, ethoxy, propoxy, butoxy and isomeric forms thereof. Representative araliphatic (aliphatically bound) diisocyanates are as follows:

1-(3-isocyanatopropoxy)-4-(3-isocyanatopropyl)benzene;

1-(3-isocyanatopropoxy)-4-(3-isocyanatopropyl)-2-methyl-benzene;

1-(3-isocyanatopropoxy)-4-(3-isocyanatopropyl)-3-methyl-benzene;

1-(3-isocyanatopropoxy)-2-(3-isocyanatopropyl)-4-methylbenzene;

1-(3-isocyanatopropoxy)-4-(3-isocyanatopropyl)naththalene; and 1-(3-isocyanatopropyl)-2-(3-isocyanatopropoxy)naphthalene;

1,4-bis(3-isocyanatopropoxy)benzene;

1,3-bis(3-isocyanatopropoxy)benzene;

1,2-bis(3-isocyanatopropoxy)benzene;

1,3-bis(3-isocyanatopropoxy)naphthalene;

1,4-bis(3-isocyanatopropoxy)naphthalene;

1,5-bis(3-isocyanatopropoxy)naphthalene;
2,3-bis(3-isocyanatopropoxy)naphthalene;
2,7-bis(3-isocyanatopropoxy)naphthalene;
4,4'-bis(3-isocyanatopropoxy)-3,3'-dimethylbiphenyl; and
2,2-bis[p(3-isocyanatopropoxy)phenyl]propane.

The preparation of the aliphatic or aliphatically bound araliphatic polyisocyanates is effected by conventional methods known in the art such as the phosgenation of the corresponding organic amine or, as specifically described in the above Oertel et al and Richter et al patents. Representative commercially available tetramethyl xylene diisocyanates are the meta and para tetramethyl xylene diisocyanates. They may be prepared by introducing hydrogen chloride into meta and/or para diisopropyl benzene to produce tetramethyl xylene dichloride and then reacting with sodium cyanate in the presence of a suitable catalyst such as zinc chloride to yield the desired diisocyanate.

Quasi-prepolymers may also be employed in the process of the subject invention. Quasi-prepolymers are prepared by reacting an excess of aliphatic polyisocyanate with a minor amount of an amine terminated polyether. The use of any one specific amine terminated compound is not critical. Generally the quasi-prepolymers have a free isocyanate content of about 20% to about 40% by weight. The amount of aliphatic isocyanate that is employed in the preparation of the reaction injection molded polyurethane/urea elastomer of the invention should generally be sufficient to provide about 1.00 to about 1.17 isocyanate groups per amine group.

In addition to the previously described ingredients for use in the preparation of the reaction injection molded polyurethane/urea elastomer, other ingredients such as blowing agents, inert gases, catalysts, surfactants, fillers, pigments, and the like can be included in the preparation of the foamed or molded compositions.

The microcellular foams of the invention can be produced by reducing the density of the polyurethane/urea polymers of the invention, for instance, the densities can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520, L-5320 and L-5340 commercially available from P. H. Goldschmidt, AG., mixtures thereof and the like.

Surfactants which can be used are the conventional surfactants used in urethane preparation such as the polysiloxanes or the alkylene oxide adducts of organic compounds containing reactive hydrogen atoms such as the ethylene oxide adducts of alcohols, glycols, and phenols. Generally the surfactants are employed in amounts of about 0.01 to about 5 parts by weight per 100 parts by weight of amine terminated polyether.

Conventional fillers for use herein include for example aluminum silicate, calcium silicate, magnesium silicate, calcium carbonate, barium sulfate, calcium sulfate, glass fibers, carbon black and silica. The filler, if used, is normally present in an amount of about 5 parts by weight to about 50 parts by weight, or up to about 100 parts by weight for foams, per 100 parts by weight of amine terminated polyether. Useful fillers include milled glass fiber, chopped glass, mineral fibers, mica, ground glass and include their surface treated forms.

Pigments which can be used herein can be any conventional pigment heretofor disclosed in the art such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

Conventional blowing agents such as water, halohydrocarbons, hydrocarbons and the like, can be employed herein in their conventional amounts. Particularly preferred blowing agents for the preparation of high resilience polyurethane foams are water and trichloromonofluoromethane.

Any of the catalysts employed in the preparation of polyurethanes can be employed in the subject invention. It is emphasized that no catalyst is required to obtain the molded or foamed elastomer products. Suitably fast reaction occurs so as to permit the molded products to be removed from the mold at commercially acceptable speed. However, in the practice of this invention to make molded articles, it is often desirable to utilize a preheated mold, for instance, at a temperature of about 135° C. In addition, or alternatively to use of a preheated mold, more efficient mixing procedures for combination of the reactants is often desirable. Thus conventional mixing procedures may be modified to achieve turbulent flow during injection of the reactants into the mold. This can easily be accomplished by the use of smaller than conventional diameter orifices on the injection inlet ports. Representative catalysts include the tertiary amine catalysts such as diethylenetriamine, ketimine, tetramethylene diamine, triethylenediamine, tetramethylenediamine, tetramethylguanidine, trimethylpiperazine and the metalo-organic salt catalysts which are polyvalent metal salts of an organic acid having up to about 18 carbon atoms and no active hydrogen atoms. The organo portion of the salt may be either linear or cyclic or saturated or unsaturated. Generally, the polyvalent metal has a valence from about 2 to 4. Typical salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)-dodecyl succinate, phenylmercuric benzoate, cadmium naphthenate, dimethyltin dilaurate, dibutyltin dilaurate and dibutyltin di-2-ethylhexoate. Generally these catalysts can be employed in amounts of about 0.01 part to about 7.5 parts, all by weight, based on the weight of the amine terminated polyether.

The following Examples illustrate the various aspects of the invention but are not intended to limit its scope.

Where not otherwise specified throughout this specification and claims, temperatures are given in degrees centigrade and parts, percentages, and proportions are by weight.

EXAMPLE 1

A formulation with 30 parts 1,8-p-diaminomenthane and 100 parts of a polypropylene oxide triamine of about 5000 molecular weight, sold under the trademark Jeffamine ® T-5000, is charged to the "B" side of an Accuratio VR-60 RIM machine. Methylene bis(4-cyclohexyl isocyanate) is charged to the "A" side. The streams are mixed at $NCO/NH_2 = 1.05$ at a total throughput of 60 lb/min with 2500 psi back pressure and dispensed into a 70° C. $10 \times 10 \times \frac{1}{8}$ inch chrome-plated steel plaque mold with no mold release agent. The part is demolded in ten seconds and has a flexural modulus of 36,700 psi, a tensile strength of 2500 psi, an ultimate elongation of 240%, and a notched Izod impact strength of 6.1 ft-lb/in. After post-curing at 150° C. for 30 minutes the part has a flexural modulus of 33,800 psi, a tensile strength of 3450 psi, an ultimate elongation of 320% and a notched Izod impact strength of 6.4 ft-lb/in.

EXAMPLE 2

A formulation consisting of 20 parts by weight 1,8 p-diaminomenthane and 100 parts by weight of a polypropylene oxide diamine of about 2000 molecular weight, sold under the trademark Jeffamine ® D-2000, is charged to the "B" side of an Accuratio VR-60 RIM machine. Methylene bis(4-cyclohexyl isocyanate) is charged to the "A" side. The streams are mixed at $NCO/NH_2 = 1.05$ at a total throughput of 60 lb/min with 2500 psi back pressure and dispensed into a 70° C. $10 \times 10 \times \frac{1}{8}$ inch chrome plated steel plaque mold with no mold release agent. The part is demolded in ten seconds and has a flexural modulus of 26,500 psi, a tensile strength of 3000 psi, an ultimate elongation of 430%, and a notched Izod impact strength of 9.5 ft-lb/in. After post-curing at 150° C. for 30 min., the part has a flexural modulus of 22,600 psi, a tensile strength of 5200 psi, an ultimate elongation of 470% and a notched Izod impact strength of 8.8 ft-lb/in.

While this invention has been described with reference to certain embodiments, it will be recognized by those skilled in the art that many variations are possible without departing from the spirit and scope of the invention and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A reaction injection molded or a microcellular foamed polyurethane/urea elastomer comprising the reaction product of a primary or secondary amine terminated, active hydrogen containing polymer of at least 1500 molecular weight having greater than 50% of the active hydrogen in the form of amine hydrogen, an aliphatically bound polyisocyanate, and a chain extender consisting essentially of at least one of a compound represented by the formula:

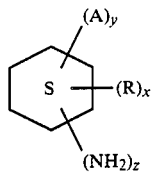

wherein
A is represented by the group

each R, $R_1$ and $R_2$ are independently hydrogen or an alkyl group having 1 to about 4 carbon atoms, x has a value of zero to about 4; y has a value of 1 or 2; z has a value of zero or 1, and when y is 2, z is zero and the sum of y and z is 2, or a compound represented by the formula:

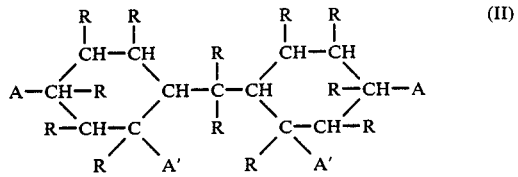

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H.

2. The elastomer of claim 1 wherein said diamine chain extender is 1,8 p-diaminomenthane, isophorone diamine, bis(4-amino cyclohexyl)methane or mixtures thereof and said aliphatically bound polyisocyanate is selected from the group consisting of an aliphatic diisocyanate, an aliphatic diisocyanate containing an aromatic moiety, and mixtures thereof.

3. The elastomer of claim 2 wherein said aliphatically bound polyisocyanate is selected from the group consisting of methylene bis(4-cyclohexyl isocyanate), meta and para tetramethyl xylene diisocyanate and mixtures thereof.

4. The elastomer of claim 3 wherein said amine terminated polymer is an amine terminated polyether selected from the group consisting of a propylene oxide triamine having a molecular weight of about 5,000, a propylene oxide diamine having a molecular weight of about 2,000, and mixtures thereof.

5. The elastomer of claim 4 wherein said diamine chain extender is 1,8 p-diaminomenthane and said aliphatic diisocyanate is methylene bis(4-cyclohexyl isocyanate).

6. A process for preparing polyurethane/urea elastomers comprising reacting an aliphatically bound polyisocyanate, a primary or secondary, amine terminated, active hydrogen containing polymer having a molecular weight of at least 1500 and having greater than 50% of the active hydrogen in the form of amine hydrogen, and a chain extender consisting essentially of an aliphatic diamine chain extender wherein said diamine is selected from at least one of the group consisting of:

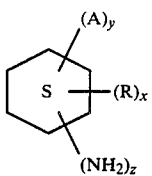

(I)

wherein
A is represented by the group

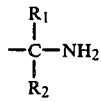

each R, $R_1$ and $R_2$ are independently hydrogen or an alkyl group having from 1 to about 4 carbon atoms, x has a value from zero to about 4; y has a value of 1 or 2; z has a value of zero or 1, and when y is 2, z is zero and the sum of y and z is 2 and

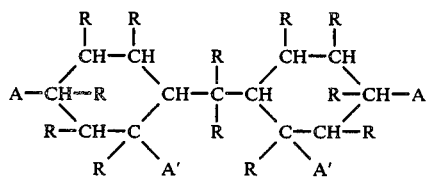

(II)

wherein R is H or alkyl of 1 to 4 carbon atoms and A and A' are $NH_2$ or H with the provises that in each ring either A or A' is $NH_2$, not both and when A or A' is $NH_2$ then the R attached to that carbon atom is H.

7. The process of claim 6 wherein said diamine chain extender is selected from at least one of the group consisting of bis(4-amino cyclohexyl)methane, 1,8 p-diaminomenthane, and isophorone diamine.

8. The process of claim 7 wherein said aliphatically bound polyisocyanate is selected from the group consisting of an aliphatic diisocyanate, an aliphatic diisocyanate containing an aromatic moiety, and mixtures thereof.

9. The process of claim 8 wherein said aliphatically bound polyisocyanate is selected from at least one of the group consisting of methylene bis(4-cyclohexyl isocyanate), meta and para tetramethyl xylene diisocyanate, 1,4-bis(2-isocyanatoethyl)cyclohexane, and araliphatic diisocyanates having the formula:

$OCN(CH_2)_3OArX(CH_2)_3NCO$ wherein X is oxygen or a single bond and Ar is an arylene radical selected from the group consisting of phenylene, tolylene, naphthylene, diphenylene, and radicals having the formula:

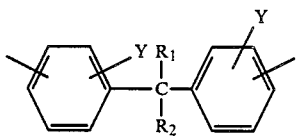

wherein $R_1$ and $R_2$ each represent a moiety selected from the class consisting of hydrogen and alkyl of 1 to 4 carbon atoms, and Y is selected from the group consisting of hydrogen, alkyl of 1 to 4 carbon atoms, and alkoxy 1 to 4 carbon atoms.

10. A reaction injection molded or a microcellular foamed polyurethane/urea elastomer prepared in accordance with the process of claim 6.

11. In a reactive composition suitable for preparation of a reaction injection molded product or a microcellular foamed product comprising:
(a) an aliphatically bound polyisocyanate selected from the group consisting of at least one of an aliphatic polyisocyanate or a polyisocyanate containing aromatic moieties;
(b) a primary or secondary amine terminated, active hydrogen containing polymer having a molecular weight of at least 1500 and having greater than 50% of the active hydrogen in the form of amine hydrogen; the improvement comprising using
(c) about 5 to about 50 parts by weight of a chain extender consisting essentially of an aliphatic diamine, based upon 100 parts by weight of (b), said amount being effective to provide improved green strength in a reaction injection molded product prepared from said composition, said aliphatic diamine chain extender selected from at least one of the group consisting of a compound represented by the formula:

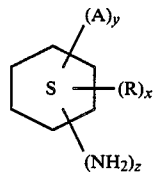

(I)

wherein
A is represented by the group

each R, $R_1$ and $R_2$ are independently hydrogen or an alkyl group having 1 to about 4 carbon atoms, x has a value of zero to about 4; y has a value of 1 or 2; z has a value of zero or 1, and when y is 2, z is zero and the sum of y and z is 2 and a compound represented by the formula:

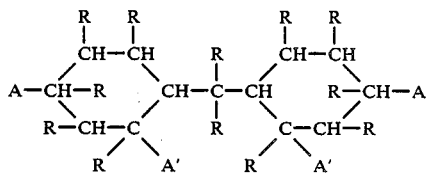

(II)

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H.

12. The reactive composition of claim 11 wherein said diamine chain extender is 1,8 p-diaminomenthane, isophorone diamine, bis(4-amino cyclohexyl)methane or mixtures thereof.

13. The reactive composition of claim 12 wherein said aliphatically bound polyisocyanate is selected from at least one of the group consisting of methylene bis(4-cyclohexyl isocyanate), meta and para tetramethyl xylene diisocyanate, 1,4-bis(2-isocyanatoethyl)cyclohexane, and araliphatic diisocyanates having the formula:

$$OCN(CH_2)_3OArX(CH_2)_3NCO$$

wherein X is oxygen or a single bond and Ar is an arylene radical selected from the group consisting of phenylene, tolylene, naphthylene, diphenylene, and radicals having the formula:

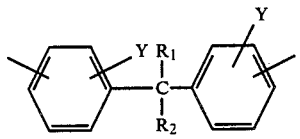

wherein $R_1$ and $R_2$ each represent a moiety selected from the class consisting of hydrogen and alkyl of 1 to 4 carbon atoms, and Y is selected from the group consisting of hydrogen, alkyl of 1 to 4 carbon atoms, and alkoxy of 1 to 4 carbon atoms.

14. The reactive composition of claim 13 wherein said aliphatically bound polyisocyanate is selected from the group consisting of methylene bis(4-cyclohexyl isocyanate), meta and para tetramethyl xylene diisocyanate and mixtures thereof.

15. The reactive composition of claim 14 wherein said amine terminated polymer is an amine terminated polyether selected from the group consisting of a propylene oxide triamine having a molecular weight of about 5,000, a propylene oxide diamine having a molecular weight of about 2,000, and mixtures thereof.

16. The reactive composition of claim 15 wherein said diamine chain extender is 1,8 p-diaminomenthane and said aliphatic diisocyanate is methylene bis(4-cyclohexyl isocyanate).

* * * * *